United States Patent
Glascock

(10) Patent No.: US 7,231,314 B2
(45) Date of Patent: Jun. 12, 2007

(54) METHOD AND APPARATUS FOR MEASURING WALL THICKNESS, OVALITY OF TUBULAR MATERIALS

(75) Inventor: David Glascock, Spring, TX (US)

(73) Assignee: Cudd Pressure Control, Inc., Houston, TX (US)

( * ) Notice: Subject to any disclaimer, the term of this patent is extended or adjusted under 35 U.S.C. 154(b) by 0 days.

(21) Appl. No.: 11/367,031

(22) Filed: Mar. 2, 2006

(65) Prior Publication Data

US 2006/0212261 A1    Sep. 21, 2006

Related U.S. Application Data

(60) Provisional application No. 60/657,853, filed on Mar. 2, 2005.

(51) Int. Cl.
    *G01B 7/00* (2006.01)
(52) U.S. Cl. ........................... 702/155; 702/171
(58) Field of Classification Search ............ 702/155, 702/171
    See application file for complete search history.

(56) References Cited

U.S. PATENT DOCUMENTS 6,272,762 B1 *  8/2001  Kinast et al. ............... 33/550
6,568,096 B1 *  5/2003  Svitkin et al. ............. 33/550

OTHER PUBLICATIONS

D. Moore; "Design Considerations in Multiprobe Roundness Measurement;" J. Phys. E: Sci. Instrum. 22 (1989) 339-343. Printed in the UK.

* cited by examiner

*Primary Examiner*—Michael Nghiem
*Assistant Examiner*—Stephen J. Cherry
(74) *Attorney, Agent, or Firm*—Wong, Cabello, Lutsch, Rutherford, & Brucculeri, LLP

(57) ABSTRACT

The wall thickness and ovality of a tubular are simultaneously determined. The theoretical radius of a pipe is computed from a measurement of its circumference. An ultrasonic device conventionally used to measure the wall thickness of tubulars is adapted to also measure the maximum and minimum diameters and ovality by equipping or utilizing existing ultrasound inspection device with contact surfaces which contact the tubular at a fixed distance apart and at a known distance from the surface of the ultrasonic transducer. The contact surfaces define a chord of known length on the tubular under test. The mean radius of the tubular may be computed from multiple water path measurements around the circumference relative to a known fixture. The maximum and minimum diameter and ovality are calculated from the measured differences in distance from the surface of the tubular to the ultrasonic transducer and the theoretical circle. Wall thickness and ovality may be correlated relative to position by using the same apparatus for both measurements.

14 Claims, 1 Drawing Sheet

METHOD AND APPARATUS FOR MEASURING WALL THICKNESS, OVALITY OF TUBULAR MATERIALS

CROSS-REFERENCES TO RELATED APPLICATIONS

Figure 1:
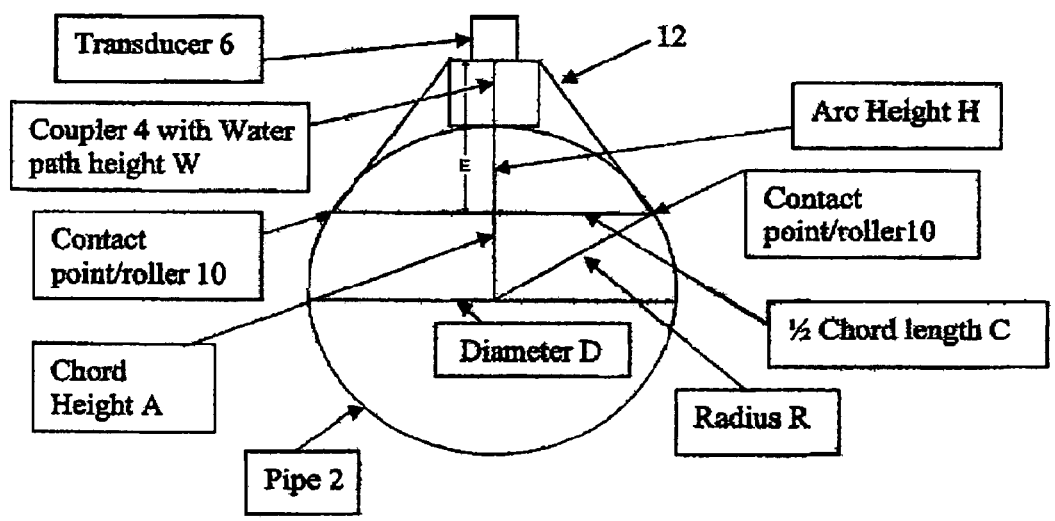

This application claims priority to a provisional patent application by the same inventors, entitled: "Method and Apparatus for Measuring Wall Thickness, Ovality of Tubular Materials," Ser. No. 60/657,853, filed on Mar. 2, 2005.

BACKGROUND OF THE INVENTION

1. Field of the Invention

This invention relates to methods and devices for measuring the dimensions and mechanical properties of pipes, tubes and the like. More particularly, it relates to an ultrasonic device which measures the wall thickness and the maximum and minimum diameter using an ultrasonic probe, instrumentation and a triangulated fixture. It includes subsequent calculations of the wall thickness eccentricity and the associated ovality [roundness] of the pipe and tube relative to position.

2. Description of the Related Art

A perfect circle is the most desirable cross section for tubulars. It provides the greatest strength—i.e., resistance to both internal and external pressure—of any known shape. Moreover, a perfectly [or near perfect] circular cross section facilitates the joining of tubulars to fittings, additional sections of tubular material and the like.

Wall thickness and wall integrity are also important parameters of tubular materials. In general, thicker walls and walls that are free from defects in the material forming the wall provide greater strength and hence greater safety. The combination of the wall thickness and associated ovality data along the length of the tubular is necessary calculations to determine collapse and burst pressures.

In the past, wall thickness and ovality have been measured separately, using two different measuring devices. Most commonly, wall thickness has been measured using an ultrasonic instrument with a transducer coupled to the tubular under test with a liquid [water] interface. The time for the ultrasonic waves to reflect from both the external and internal surfaces of the tubular is converted into distance (wall thickness) using the measured the time and the known velocity of the sound wave in the material.

Diameter is presently measured using a mechanical device such as a micrometer, an optical device such as a laser or camera or multiple ultrasound transducers or an array mounted to a known diameter fixture reference which surrounds the tubular.

An oval may be considered a flattened circle or an ellipse. An ellipse is a closed plane curve generated by a point moving in such a way that the sums of its distances from two fixed points (foci) is a constant. The length from one side of an ellipse to the other which passes through both foci may be considered its major diameter. A line perpendicular to the major diameter and passing through the ellipse at its widest part may be considered its minor diameter. Ovality may be defined as being the major diameter minus minor diameter. A perfect circle has an ovality of zero. Alternatively, pipe ovality may be expressed as a percentage:

% Pipe Ovality=100×(Max. Diameter−Min. Diameter)/Mean Diameter

There are many useful applications for applying diameter, ovality, wall thickness and eccentricity determinations to pipe and tubes. Engineers use the combination of pipe wall thickness and ovality for their burst and collapse calculations The process of bending straight pipe to make it into a coil distorts its original, circular cross-section into an oval and leaves it with a permanent curvature. Codes prohibit installing pipe that is more than 5% oval. The diameter and ovality (shape) of pipe ends can greatly complicate aligning the ends for butt-welding the pipes together. Drill pipe is subjected to both outside and inside wear due to the environment Codes govern the dimensional properties of drill pipe.

SUMMARY OF THE INVENTION

The present invention comprises a method and apparatus for measuring wall thickness and ovality of tubular materials. The invention also provides a method for adapting an ultrasonic device used for measuring the wall thickness on a pipe or tube, to also measure the maximum and minimum diameter and ovality. The transducer water path is measured using a known triangulated fixture for positioning the transducer relative to the surface of the pipe or tube and the mean radius and center is computed. The mean radius, arc height (H) and ½ chord length (C) are related by the derived equation; $R=(C^2/2H)+H/2$. Diameter (and associated ovality) may be calculated by applying the measured arc height changes to the mean radius and calculating actual pipe radius at different positions around the circumference of the pipe or tube.

BRIEF DESCRIPTION OF THE DRAWING FIGURES

FIG. 1 is a cross sectional view of a tubular in contact with an ultrasonic measuring device.

The dimensions of the triangulated fixture (including height) are fixed, thus any change in the measured water path results in a corresponding opposing increase or decrease in the chord height (A). From the above diagram the following relationship applies:

$H=R-A$ $R-H=\text{square root } (R^2-C^2)$

And further simplified $R=C^2/2H+H/2$

The preferred fixture contact points subtend an arc angle from 90 to 180 degrees.

DETAILED DESCRIPTION

Referring now to FIG. 1, a tubular 2 of diameter D is shown in contact with measuring device 12 comprised of ultrasonic transducer 6 and coupler 4 which may be filled with a fluid which may, in some embodiments, be water.

Coupler or shoe 4 may include contact rollers 10 for contacting the external surface of pipe 2. The height E (H+W) from the ultrasonic transducer 6 and a chord connecting the contact points of rollers 10 is determined by manufacture and may be measured.

In certain embodiments, fixture 12 is not equipped with rollers 10. Nevertheless, the height E from the chord joining the points of contact and the transducer is fixed and may be measured with a high degree of accuracy.

It will be appreciated by those skilled in the art that the water path distance W between transducer 6 and the external surface of pipe 2 may be measured electronically by measuring device 12.

The mean radius of pipe 2 is calculated using the average arc heights (H) for one revolution, the fixed (measured) transducer-to-chord distance E (where E=H+W), and the equation:

$$R = C^2/2H/2$$

The mean radius of the pipe describes the theoretical pipe center and circumference to which the ovality has been applied. The diameter and circumference may be calculated from the equations of a circle. Alternately the circumference may be measured and the theoretical pipe center and radius calculated.

The theoretical circle describes the real pipe circumference and applicable center for a circle, for an oval shape it is assumed that the change in (A) relative to the major and minor axis will be negated and the difference between the measured maximum and minimum arc height above that of the theoretical circle center will provide for the approximate maximum and minimum diameter of the pipe. The ovality can be calculated using the difference between the maximum and minimum diameter per pipe revolution.

It is known in the industry that the same ultrasonic probe that is used to measure the water path (W) can also be used to measure the wall thickness at the same location. Eccentricity may be calculated using the variation in wall thickness per revolution of the pipe.

Since maximum and minimum diameter (ovality) may be determined using substantially the same apparatus as that used to measure wall thickness and eccentricity they can be correlated relative to position.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for determining the maximum and minimum diameter, wall thickness and ovality of a tubular item at a selected position along the length of the tubular item comprising:
    determining the circumference of the tubular item at the selected position;
    calculating the diameter of a circle having a circumference equal to the determined circumference;
    contacting the external surface of the tubular item at two points in a plane substantially perpendicular to the major axis of the tubular item;
    rotating the tubular item while measuring the distance from the surface of the tubular item at a point halfway between the two points of contact to a measuring device located at a known distance from a line connecting the two points of contact;
    measuring the wall thickness of the tubular item while the tubular item is being rotated;
    calculating a set of observed radii from the measured distances from the surface of the tubular item at a point halfway between the two points of contact to the measuring device and the length of the line connecting the two points of contact;
    selecting the minimum and maximum values from the set of observed radii;
    calculating the ovality of the tubular item using the difference between the maximum and minimum diameters determined per revolution;
    correlating calculated ovality and measured wall thickness values; and
    reporting correlated ovality and wall thickness values.

2. A method as recited in claim 1 wherein the measuring device is an ultrasound transducer.

3. A method as recited in claim 1 wherein reporting correlated ovality and wall thickness values comprises displaying numerical results on a display device.

4. A method as recited in claim 1 wherein reporting correlated ovality and wall thickness values comprises displaying graphical results on a display device.

5. A method as recited in claim 1 wherein reporting correlated ovality and wall thickness values comprises printing numerical results on a printer.

6. A method as recited in claim 1 wherein reporting correlated ovality and wall thickness values comprises printing graphical results on a printer.

7. A method as recited in claim 1 wherein reporting correlated ovality and wall thickness values comprises storing the results in a data storage medium.

8. A method as recited in claim 1 wherein determining the circumference of the tubular item at the selected position comprises a physical measurement of the circumference.

9. A method as recited in claim 1 wherein determining the circumference of the tubular item at the selected position comprises calculating the circumference of a circle having a radius equal to the mean radius of the set of observed radii.

10. An apparatus for determining the maximum and minimum diameter, wall thickness and ovality of a tubular item at a selected position along the length of the tubular item comprising:
    means for determining the circumference of the tubular item at the selected position;
    means for calculating the diameter of a circle having a circumference equal to the determined circumference;
    a fixture which contacts the external surface of the tubular item at two points in a plane substantially perpendicular to the major axis of the tubular item;
    means for rotating the tubular item while measuring the distance from the surface of the tubular item at a point halfway between the two points of contact to a measuring device located at a known distance from a line connecting the two points of contact;
    means for measuring the wall thickness of the tubular item while the tubular item is being rotated;
    means for calculating a set of observed radii from the measured distances from the surface of the tubular item at a point halfway between the two points of contact to the measuring device and the length of the line connecting the two points of contact;
    means for selecting the minimum and maximum values from the set of observed radii;
    means for calculating the ovality of the tubular item using the difference between the maximum and minimum diameters determined per revolution;
    means for correlating calculated ovality and measured wall thickness values; and
    means for reporting correlated ovality and wall thickness values.

11. An apparatus as recited in claim 10 wherein the means for measuring the wall thickness of the tubular item while the tubular item is being rotated comprises an ultrasound transducer.

12. An apparatus as recited in claim 10 wherein the means for reporting correlated ovality and wall thickness values comprises a display device.

13. An apparatus as recited in claim 10 wherein the means for reporting correlated ovality and wall thickness values comprises a printer.

14. An apparatus as recited in claim 10 wherein the means for reporting correlated ovality and wall thickness values comprises a data storage medium.

* * * * *